US011598165B2

(12) United States Patent
Collins

(10) Patent No.: US 11,598,165 B2
(45) Date of Patent: Mar. 7, 2023

(54) AUTOMATED DRILLING-FLUID ADDITIVE SYSTEM AND METHOD

(71) Applicant: Kyle Collins, San Marcos, TX (US)

(72) Inventor: Kyle Collins, San Marcos, TX (US)

( * ) Notice: Subject to any disclaimer, the term of this patent is extended or adjusted under 35 U.S.C. 154(b) by 0 days.

(21) Appl. No.: 17/537,262

(22) Filed: Nov. 29, 2021

(65) Prior Publication Data

US 2022/0081980 A1    Mar. 17, 2022

Related U.S. Application Data

(63) Continuation-in-part of application No. 16/533,313, filed on Aug. 6, 2019, now Pat. No. 11,187,050.

(51) Int. Cl.
| | |
|---|---|
| *E21B 21/08* | (2006.01) |
| *C09K 8/035* | (2006.01) |
| *E21B 21/01* | (2006.01) |
| *E21B 21/10* | (2006.01) |
| *E21B 21/06* | (2006.01) |

(52) U.S. Cl.
CPC .............. *E21B 21/08* (2013.01); *C09K 8/035* (2013.01); *E21B 21/01* (2013.01); *E21B 21/062* (2013.01); *E21B 21/106* (2013.01)

(58) Field of Classification Search
CPC ................................................ E21B 21/06–07
See application file for complete search history.

(56) References Cited

U.S. PATENT DOCUMENTS 11,187,050 B2 *  11/2021  Collins ............... B01F 35/2136
2019/0264517 A1 *   8/2019  Chong ............. B01F 35/21111

* cited by examiner

*Primary Examiner* — Kristyn A Hall
(74) *Attorney, Agent, or Firm* — Keaty Law Firm LLC

(57) ABSTRACT

An automated drilling-fluid additive system and method for on-site real-time analysis and additive treatment of drilling fluid to be injected into a well. The drilling fluid includes returned drilling fluid intended to be re-used, which has a variety of viscosity and other qualities resulting from its various preceding use. The target drilling fluid will have a variety of viscosity and other qualities depending upon and changing with various phases of drilling operations and various conditions encountered. The drilling fluid is analyzed in real time as it flows into the automated drilling-fluid additive system, and various additives are added to and thoroughly blended with the drilling fluid as needed to achieve the desired result. The blended drilling fluid is discharged from the automated drilling-fluid additive system in the proper condition for injection into a well.

5 Claims, 3 Drawing Sheets

AUTOMATED DRILLING-FLUID ADDITIVE SYSTEM AND METHOD

CROSS-REFERENCE TO RELATED APPLICATIONS

This application is a continuation-in-part of co-pending application Ser. No. 16/533,313, filed on Aug. 6, 2019, the full disclosure of which is incorporated by reference herein and priority of which is hereby claimed.

BACKGROUND OF THE INVENTION

This invention provides an automated drilling-fluid additive system and method.

Drilling fluid or drilling mud is used in drilling operations and is used extensively and for a variety of uses in coiled-tubing, directional drilling, and fracking operations. The drilling mud is injected into the well and usually returns to the surface though the annulus. The returned drilling mud contains shavings and other debris, and often returns with changed viscosity and other qualities, and serves as an indicator of the conditions at the work string and along the drill string.

It is often desired to re-use the returned drilling mud after removal of debris and after reconstituting and reconditioning the returned drilling mud with additives to restore the desired viscosity and other qualities. Even when using fresh drilling mud, it is often desired to adjust the qualities with additives appropriate to the particular conditions and the particular operations being performed.

The process of blending the thick drilling mud requires a large amount of agitation or turbulence. Presently, drilling mud is held in an intermediate storage and settling tank after additives have been blended in, before being injected into the well by a high-pressure pump. Even where additives have been blended in using a semi-automated process, the blended drilling mud must be held in and drawn from an intermediate storage and settling tank in order to eliminate the turbulence necessarily introduced in blending the additives with the drilling mud, but which is highly undesirable for feeding into the high-pressure injection pump. The storage and settling tank is prone to problems such as overflowing, emptying, or allowing additives to settle out.

What is needed is an automated drilling-fluid additive system capable of analyzing incoming drilling fluid in real time, adding appropriate additives, thoroughly blending the drilling fluid, eliminating the turbulence resulting from blending, and delivering a flow of blended drilling fluid for direct injection into a well without any storage in a holding tank and without any further processing, treatment, or handling.

U.S. Patent Application Publication No. 2013/0021868 for a "Static Fluid Mixer and Method," published on Jan. 24, 2013 by inventors Michael B. Doolin et al., discloses a static mixing apparatus and method where a carrier fluid and an added input fluid are mixed together in a static mixer to create an emulsified output fluid mixture. The static mixer comprises a plurality of mixing chambers whose cross-sectional size expand considerably relative to an inlet, a series of bent and curved baffle plates which divert, rotate, divide, reverse and otherwise create turbulence in the combined flow, and inlet chamber in which the added input fluid is dispensed upstream into the carrier fluid, and a number of other structural mixing elements which, through turbulence, abrupt pressure drops and velocity changes, subdivide the added input mixture into very small volumetric quantities evenly dispersed within the carrier fluid to create a homogeneous output fluid mixture.

U.S. Patent Application Publication No. 2004/0008571 for an "Apparatus and Method for Accelerating Hydration of Particulate Polymer," published on Jan. 15, 2004 by inventors Richard Coody et al., discloses an apparatus and method for hydrating particulate polymer. In its preferred embodiment, the apparatus includes a storage assembly, a hydration assembly and a delivery assembly that connects the storage assembly to the hydration assembly. The hydration assembly preferably includes a pre-wetter, a high-energy mixer and a blender. The preferred method for hydrating the particulate polymer includes transferring the polymer from the storage assembly to the hydration assembly. The method further includes pre-wetting the particulate polymer with a hydration fluid to form a gel, mixing the gel with additional hydration fluid in a high-energy mixer and blending the gel in a blender. The method may also include removing any air entrained in the gel in a weir tank.

U.S. Pat. No. 6,967,589 for a "Gas/Oil Well Monitoring System," issued on Nov. 22, 2005 to inventor George W. Peters, provides for a system for monitoring a gas/oil well with a monitoring unit, a relay unit and a host interface. A monitoring unit collects data regarding the status of the gas/oil well and wirelessly transmits that data to a relay unit. The relay unit, in turn, connects to a host interface using cellular communications and transmits the data. The monitoring unit can transmit information on demand or after an alarm condition is sensed. In either case, the monitoring unit is normally in a sleep mode. The relay unit can request information from the monitoring unit or respond to a wake up transmission sent to it from either the host interface or monitoring unit. The host interface receives data from the relay unit and then informs an end user of that data.

U.S. Patent Application Publication No. 2008/0264641 for a "Blending Fracturing Gel," published on Oct. 30, 2008 by inventors Billy F. Slabaugh et al., discloses that relates to a system and method for producing a well-fracturing gel using a gel concentrate such that the method and system are capable of timely adjusting the properties of the gel on the fly just prior to introducing the gel into the well. Further, this disclosure provides for producing a gel with an overall shorter production time as well as adjusting the properties of the gel just prior to injecting the gel into the well.

U.S. Pat. No. 4,716,932 for a "Continuous Well Stimulation Fluid Blending Apparatus," issued on Jan. 5, 1988 to inventor Harmon L. Adams, Jr., provides for a blender pump receiving a supply of base fluid and discharging the fluid into a particle mixing vat. A throttle valve and an input flow meter are connected to the discharge of the throttle valve. A gelling unit has its inlet connected to the blender pump discharge upstream of the throttle valve and the output of the gelling unit is connected to the upstream side of the throttle valve and downstream of the gelling unit inlet. The gelling unit includes a mixing eductor with at least one dry chemical gel feeder and a dispensing pump having a higher outlet pressure than the blender pump discharge pressure. A flow meter and valve is connected to the output of the dispensing pump for measuring and controlling the flow rate through the gelling unit.

U.S. Pat. No. 8,739,875 for a "Water Heating Apparatus for Continuous Heated Water Flow and Method for Use in Hydraulic Fracturing," issued on Jun. 3, 2014 to inventor Ransom Mark Hefley, provides for a method of hydraulic fracturing of an oil producing formation that includes the provision of a heating apparatus which is transportable and that has a vessel for containing water. A water stream of cool or cold water is transmitted from a source to a mixer, the cool or cold water stream being at ambient temperature. The mixer has an inlet that receives cool or cold water from the source and an outlet that enables a discharge of a mix of cool or cold water and the hot water. After mixing in the mixer, the water assumes a temperature that is suitable for mixing with chemicals that are used in the fracturing process, such as a temperature of about 40°–120° F.+(4.4-48.9° C.+). An outlet discharges a mix of the cool and hot water to surge tanks or to mixing tanks. In the mixing tanks, a proppant and an optional selected chemical or chemicals are added to the water which has been warmed. From the mixing tanks, the water with proppant and optional chemicals is injected into the well for part of the hydraulic fracturing operation.

U.S. Pat. No. 8,905,627 for a "Polymer Blending System," issued on Dec. 9, 2014 to inventor Jerry W. Noles, Jr., provides for a system for blending polymers and other chemicals in an aqueous liquid. Static mixers and tubes, preferably in one or more tube bundles, provide a volume sufficient to allow a residence time in the system to hydrate a polymer. Static mixers may be integrated with a tube bundle. The system may be mounted on a portable base such as a trailer. The concentration of polymer and chemicals in water may be controlled by a controller. A variable speed electric pump may be utilized to precisely control the amount of polymers or other chemicals added to the aqueous liquid.

U.S. Patent Application Publication No. 2016/0130924 for a "Hydration Apparatus and Method," published on May 12, 2016 by inventors Hau Pham et al., discloses vessels including an enclosure having an outer perimeter and an interior space, a channel disposed in the interior space, a first port disposed on a surface of the first enclosure at or proximate to a first end of the channel, and a second port disposed on a surface of the first enclosure at or proximate to a second end of the channel, where the channel has a length greater than the shortest distance between the first port and the second port, and where the first port and the second port are in fluid communication with one another. In some cases, the length of the channel is greater than a length of the outer perimeter. Optionally, the vessel may have a second enclosure having an outer perimeter and an interior space with a second channel disposed in the interior space, a third port disposed on a surface of the second enclosure at or proximate to a first end of the second channel, and a fourth port disposed on a surface of the second enclosure at or proximate to a second end of the second channel, where the second port, the third port and fourth port are in fluid communication. In yet some other optional variations, the vessel further includes a plurality of enclosures each having an outer perimeter and an interior space, a channel disposed in the interior space, a port disposed on a surface of the enclosure at or proximate to a first end of the channel, and a port disposed on a surface of the enclosure at or proximate to a second end of the channel, where the channel has a length greater than a shortest distance between the ports, and the second port and the ports disposed on the surface of the plurality of enclosures are in fluid communication. The perimeter shape of the enclosure(s) may be any suitable shape, including, but not limited to, substantially circular, ovate or rectangular.

SUMMARY OF THE INVENTION

This invention provides an automated drilling-fluid additive system and method for on-site real-time analysis and additive treatment of drilling fluid to be injected into a well. Under the real-time control of the controller, drilling fluid flowing through a conveyer pipe is analyzed in the inline diagnostic unit and appropriate additives stored in totes are added. An operator either on-site or at a remote distance can monitor and direct the operation of the automated drilling-fluid additive system through a remote communication unit.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
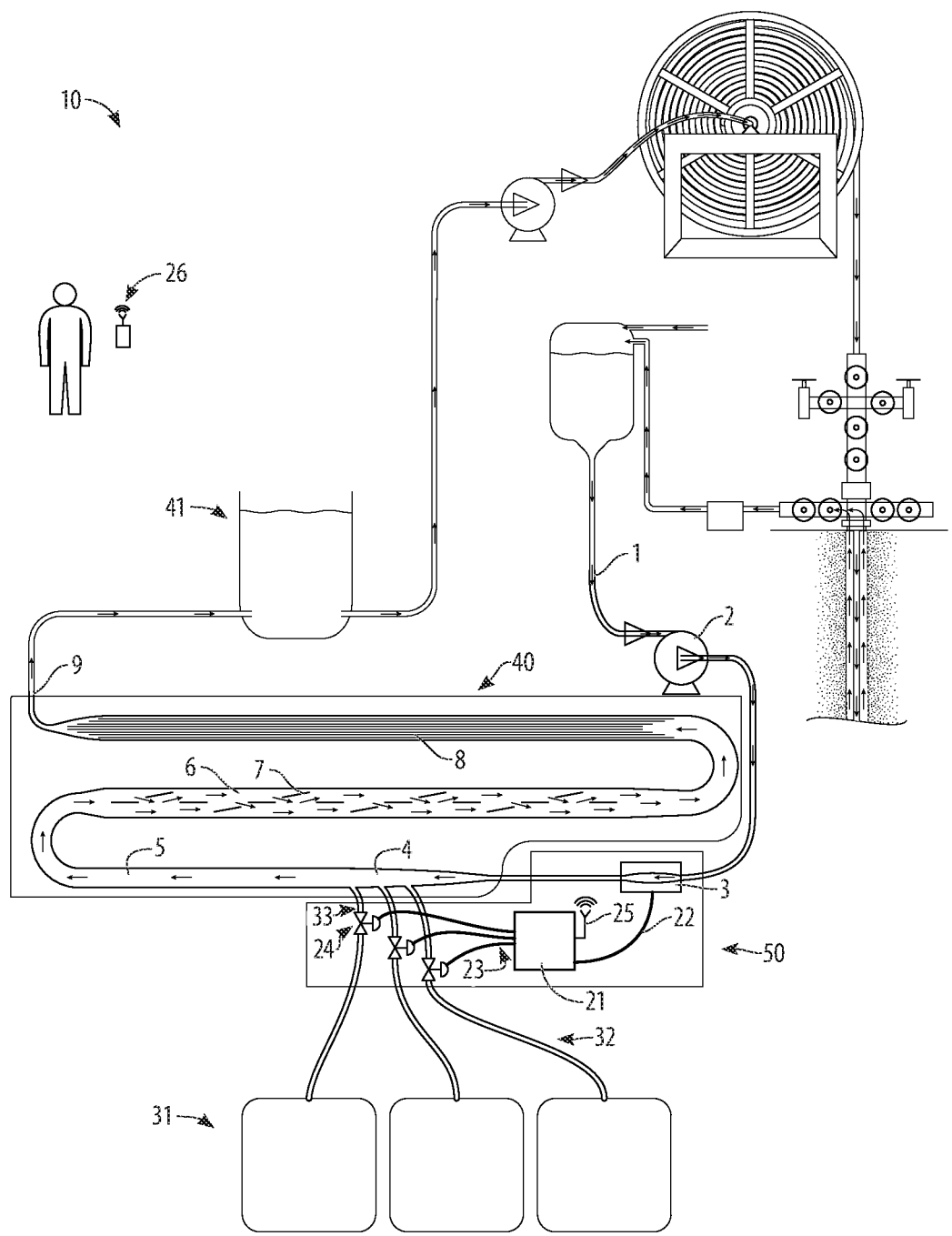
FIG. 1 is a schematic diagram of an embodiment of the automated drilling-fluid additive system and method of the invention in use.

Referring to FIG. 1, the automated drilling-fluid additive system and method 10 is shown schematically, in use in coiled-tubing drilling operations with varying mixtures of fresh and returned drilling fluid blended with desired additives provided to a high-pressure injection pump for injection into the well.

In the embodiment shown in FIG. 1, the automated drilling-fluid additive system and method 10 provides a blending unit 40 enclosing blending components as treated below, and a chemical-addition unit 50 as treated below. This embodiment is meant to be used with a holding tank 41, in circumstances where a holding tank is used instead of providing blended drilling fluid directly to the coiled-tubing operation. The holding tank 41 can also be a mixing tank, if the blended drilling fluid needs additional mixing while being held in order to, for example, prevent settling or separating of additives.

Figure 2:
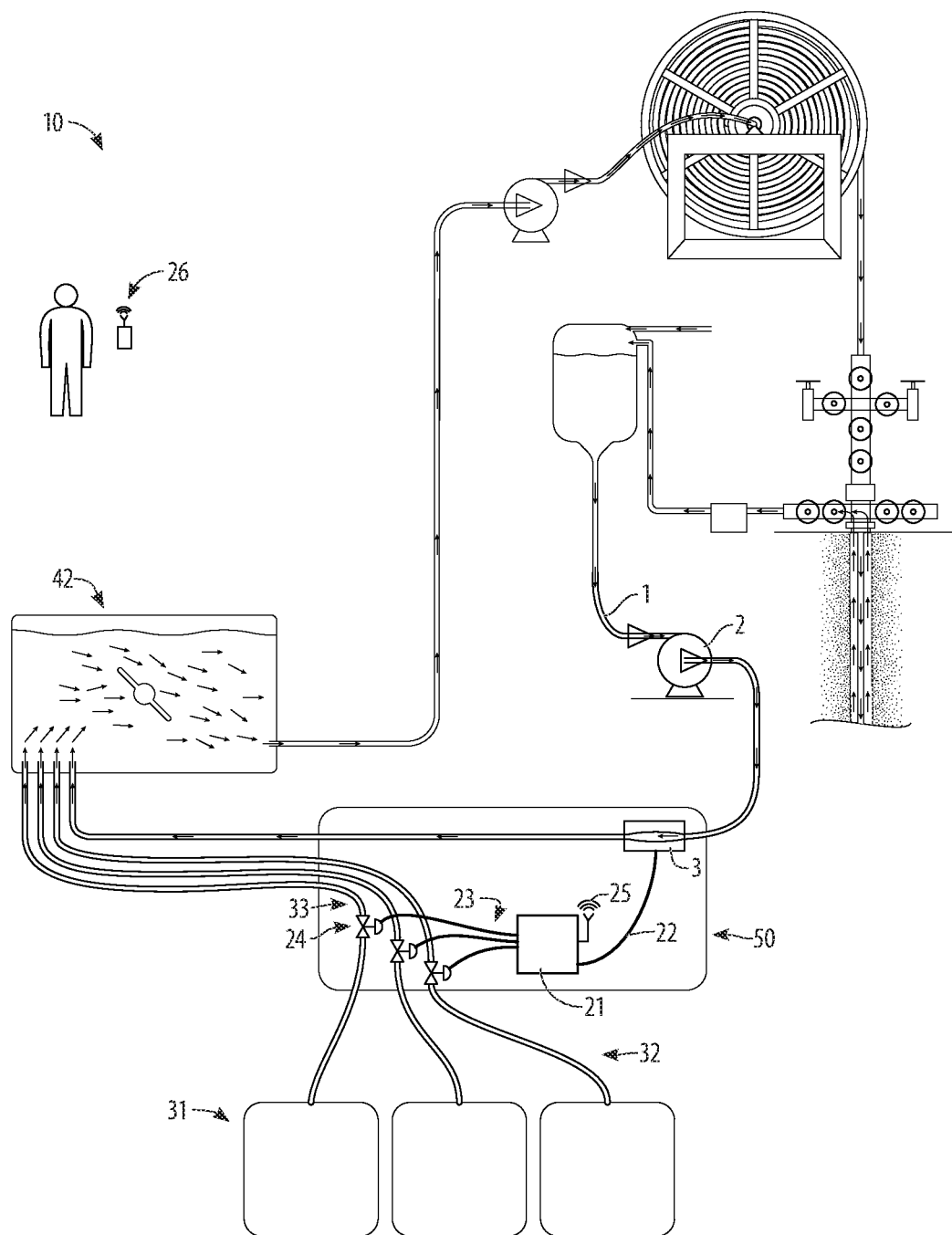
FIG. 2 is a schematic diagram of another embodiment of the automated drilling-fluid additive system and method of the invention in use.

In the embodiment shown in FIG. 2, the automated drilling-fluid additive system and method 10 provides a chemical-addition unit 50 which directly and separately supplies a mixing tank 42 with drilling fluid and the proper amount of each additive, to be blended in the mixing tank 42 before being supplied to the coiled-tubing operation. The drilling fluid blended with additives in the mixing tank 42 can optionally be either supplied directly to the coiled-tubing operation or can be held in a holding tank.

Figure 3:
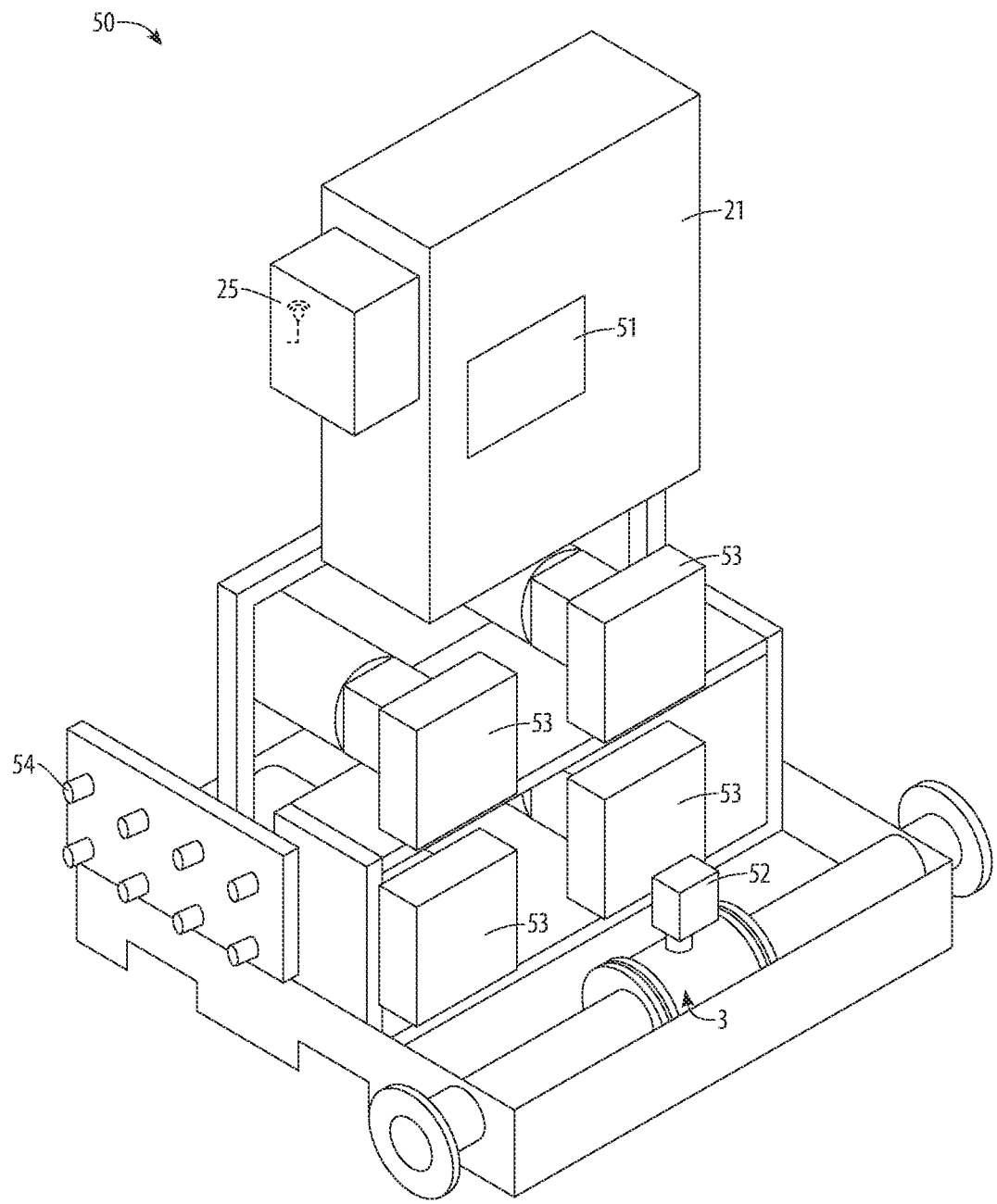
FIG. 3 is a perspective view of the chemical-addition unit of the automated drilling-fluid additive system of the invention.

Referring to FIG. 3, the chemical-addition unit 50 provides an inline diagnostic unit 3 which takes real-time measurements of the flowing drilling fluid. The inline diagnostic unit 3 is mounted in the flow of drilling fluid in standard ways such as the 4-inch flanges shown. The inline diagnostic unit 3 further provides several sensors housed in a sensor housing 52. The chemical-addition unit 50 provides multiple peristaltic pumps 53 for delivery of additives through separate cam-lock hose connectors 54, with each peristaltic pump 53 having an input and output pair. The chemical-addition unit 50 provides a controller 21, treated below, having a controller display 51 such as a touch screen monitor for displaying data and for taking user input. The chemical-addition unit 50 provides a controller communication unit 25, treated below. The chemical-addition unit 50 also provides a frame for housing its components in a safe and sturdy manner appropriate to oilfield use.

Referring back to FIG. 1, standard totes 31, each containing an additive, are placed on or near the chemical-addition unit 50 and are connected to the structure by tote fluid lines 32. Each tote can be connected or disconnected for the purpose of replacing an empty tote or connecting totes with a different additive as needed for different phases of operations or different downhole conditions encountered.

In use, drilling fluid is drawn from an inlet 1 at an upstream end, through an intake pump 2, into the chemical-addition unit 50, to the blending unit 40, and through an outlet 9 at a downstream end. A conveyor pipe 5 runs through the blending unit 40 and provides a flow path for the drilling fluid. In a preferred embodiment the conveyor pipe 5 is bent to allow a long run of pipe within the blending unit 40. The diameter of the conveyor pipe 5 varies, as treated below, but is on average larger than the diameter of the pipes attached at the inlet 1 and outlet 9, and is at no point smaller.

Drilling fluid is pushed, by the intake pump 2, through the inline diagnostic unit 3 of the chemical-addition unit 50, and into the blending unit 40, through a conveyor pipe 5 and toward the outlet 9. A moderate pressure of approximately 150 psi is appropriate. If the high-pressure injection pump slows enough to place back pressure on the intake pump 2, the intake pump should lessen or stop the flow of drilling fluid through the conveyor pipe 5. In an embodiment, the pressure imparted by the intake pump 2 can be significantly increased in order to meet a high demand for blended drilling fluid at the high-pressure injection pump.

The incoming drilling fluid passes through an inline diagnostic unit 3 which takes real-time measurements of the flowing drilling fluid, from which measurements the viscosity and other qualities of the incoming drilling fluid can be determined. The instantaneous pressure and rate of flow of incoming drilling fluid is also measured. These measurements are conveyed to a controller 21 via a diagnostic-unit connector 22.

The controller 21 receives and processes instructions through a controller communication unit 25 which communicates with a remote communication unit 26. In a preferred embodiment, the communication is local-area wireless, for communications on-site in locations possibly remote from wireless telephone signals, plus wide-area or telephone wireless for use when a signal is available. The controller 21 can also provide data and status conditions to the remote communication unit 26. Based upon the received instructions for the desired qualities of a resulting blended drilling fluid, the controller 21 processes the data provided by the inline diagnostic unit 3 and determines what additives in what amount need to be added to the incoming drilling fluid, and what rate of flow of additives is appropriate to the instantaneous pressure and rate of flow of incoming drilling fluid.

The incoming drilling fluid then flows into an expanding additive area 3 of the conveyor pipe 5 which has a larger cross-sectional area which creates a pressure drop in the flow of drilling fluid. Injection lines 33 corresponding to the tote fluid lines 32 are provided in the expanding additive area 3. The additives in the totes 31 can flow into the lower-pressure expanding additive area 3 without having to overcome the resisting pressure existing elsewhere in the conveyor pipe 5.

The flow of additives from the totes 31 through the tote fluid lines 32 and injection lines 33 into the expanding additive area 3 is controlled by flow-control valves 24 which are in turn controlled by the controller 21 through control lines 23.

At this point, the additives are not likely to be well blended or mixed with the incoming drilling fluid. The poorly blended mixture then flows into a blending area 6 of the conveyor pipe 5. The blending area 6 has an even larger cross-sectional area which creates another pressure drop. The blending area 6 is provided with turbulence vanes 7 which interrupt any laminar flow and promote turbulent flow which mixes and blends the additives and the drilling fluid.

The now well blended drilling fluid then flows into a collimator area 8 which creates a laminar flow in the blended drilling fluid by passing portions of the fluid through long smaller tubes or passageways. A "gattling gun" type of tube arrangement is appropriate. Taking care not to reintroduce turbulence, the cross-sectional diameter of the conveyor pipe 5 is reduced to that of the outlet 9 and the pipe connected to the outlet for direct delivery of a laminar flow of blended drilling fluid to the high pressure pump which injects the blended drilling fluid into the well.

Because the blended drilling fluid discharged from the outlet 9 is completely blended and is in laminar flow without turbulence, no further processing or handling of the outflow, and no further blending or settling of turbulence in a holding tank is necessary, and would instead be detrimental. The blended drilling fluid is provided to the high-pressure injection pump in a laminar flow at a steady moderate pressure.

In the embodiment of FIG. 1, the blended drilling fluid flows from the outlet 9 into a holding tank 41, for later use by the coiled-tubing operation.

Referring to FIG. 2, in the illustrated embodiment drilling fluid and the separate additives at the proper determined flow rate are conveyed separately from the chemical addition unit 50 to a mixing tank 42, for mixing, and then to downstream end of the coiled-tubing operation.

Many other changes and modifications can be made in the system and method of the present invention without departing from the spirit thereof. I therefore pray that my rights to the present invention be limited only by the scope of the appended claims.

I claim:

1. An automated drilling-fluid additive system for on-site real-time analysis and additive treatment of drilling fluid to be injected into a well, comprising:
   (i) a chemical-addition unit adapted for safety and sturdiness appropriate to oilfield use;
   (ii) at least one tote interchangeably mounted near said chemical-addition unit;
   (iii) a tote fluid line corresponding to each said tote, adapted to convey additive fluid into said chemical-addition unit;
   (iv) an inline diagnostic unit mounted in said chemical-addition unit adapted to take measurements of flowing drilling fluid in real time;
   (v) a controller adapted to analyze data received from said inline diagnostic unit via a diagnostic-unit connector, and to control the addition of additives based on such analysis;
   (vi) a flow-control valve corresponding to each said tote fluid line and injection line adapted to control the flow of an additive from each said tote through each said injection line according to control signals generated by said controller and communicated over a control line;
   (vii) a controller communication unit upon said controller adapted to report operational data to, and receive instructions from, a remote communication unit;
   (viii) a blending unit;

(ix) a conveyor pipe within said blending unit adapted to carry a stream of drilling fluid through the system, having an upstream and downstream orientation;

(x) an expanding additive area of said conveyor pipe adapted to create a pressure drop in the flow of drilling fluid, and having an intake opening corresponding to each said injection line;

(xi) a blending area of said conveyor pipe downstream of said expanding additive area adapted to provide a turbulent flow of drilling fluid by passage around turbulence vanes;

(xii) a collimator area of said conveyor pipe downstream of said blending area adapted to provide a laminar flow of blended drilling fluid; and (xiii) an outlet in said conveyor pipe downstream of said collimator area adapted to discharge a laminar flow of blended drilling fluid into a holding tank for later injection.

2. The automated drilling-fluid additive system of claim 1, further comprising a mixing tank adapted to receive drilling fluid and separate injection lines from said chemical-addition unit, mixing, and discharging mixed drilling fluid for injection.

3. The automated drilling-fluid additive system of claim 1, where said at least one tote further comprises at least three totes.

4. The automated drilling fluid additive system of claim 1, where said collimator area further comprises a gattling gun arrangement of tubes.

5. An automated drilling-fluid additive method for on-site real-time analysis and additive treatment of drilling fluid to be injected into a well, comprising:

(i) providing an automated drilling-fluid additive system, comprising:

(a) a chemical-addition unit adapted for safety and sturdiness appropriate to oilfield use;

(b) at least one tote interchangeably mounted near said chemical-addition unit;

(c) a tote fluid line corresponding to each said tote, adapted to convey additive fluid into said chemical-addition unit;

(d) an inline diagnostic unit mounted in said chemical-addition unit adapted to take measurements of flowing drilling fluid in real time;

(e) a controller adapted to analyze data received from said inline diagnostic unit via a diagnostic-unit connector, and to control the addition of additives based on such analysis;

(f) a flow-control valve corresponding to each said tote fluid line and injection line adapted to control the flow of an additive from each said tote through each said injection line according to control signals generated by said controller and communicated over a control line;

(g) a controller communication unit upon said controller adapted to report operational data to, and receive instructions from, a remote communication unit;

(h) a blending unit;

(i) a conveyor pipe within said blending unit adapted to carry a stream of drilling fluid through the system, having an upstream and downstream orientation;

(j) an expanding additive area of said conveyor pipe adapted to create a pressure drop in the flow of drilling fluid, and having an intake opening corresponding to each said injection line;

(k) a blending area of said conveyor pipe downstream of said expanding additive area adapted to provide a turbulent flow of drilling fluid by passage around turbulence vanes;

(l) a collimator area of said conveyor pipe downstream of said blending area adapted to provide a laminar flow of blended drilling fluid; and (m) an outlet in said conveyor pipe downstream of said collimator area adapted to discharge a laminar flow of blended drilling fluid into a holding tank for later injection;

(ii) providing said automated drilling-fluid additive system with said totes containing additives;

(iii) providing said controller with instructions for a target composition of drilling fluid through said controller communication unit;

(iv) monitoring operations through said controller communication unit; and (v) providing blended drilling fluid from said outlet for injection into the well.

\* \* \* \* \*